E. A. HALBLEIB.
DEVICE FOR CHARGING STORAGE BATTERIES.
APPLICATION FILED MAY 9, 1910.
1,034,108.
Patented July 30, 1912.
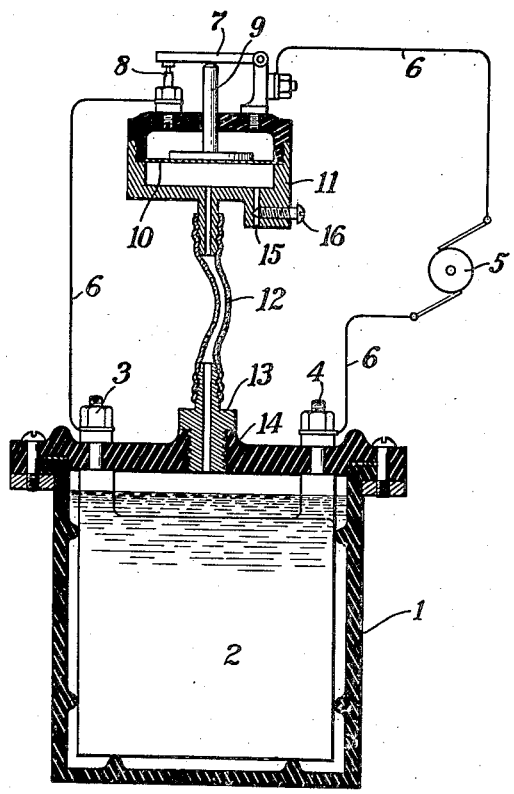
Witnesses:
Clarence W. Carroll
L. Thon
Inventor:
Edward A. Halbleib,
by his attorneys
Osgood Davis & Dorsey

UNITED STATES PATENT OFFICE.

EDWARD A. HALBLEIB, OF ROCHESTER, NEW YORK, ASSIGNOR TO NORTHEAST ELECTRIC COMPANY, OF ROCHESTER, NEW YORK, A CORPORATION.

DEVICE FOR CHARGING STORAGE BATTERIES.

1,034,108. Specification of Letters Patent. Patented July 30, 1912.

Application filed May 9, 1910. Serial No. 560,387.

*To all whom it may concern:*

Be it known that I, EDWARD A. HALBLEIB, a citizen of the United States, and resident of Rochester, in the county of Monroe and State of New York, have invented certain new and useful Improvements in Devices for Charging Storage Batteries, of which the following is a specification.

This invention relates to means for automatically controlling the operation of charging a storage battery, for the purpose of preventing overcharging.

It is well known that in charging storage batteries, particularly those of the ordinary lead type, it is desirable to discontinue the flow of charging-current as soon as the battery is completely charged, since further flow of such current has a harmful effect upon the battery. It is also desirable that the charging-current be limited within a certain maximum, as a current of greater strength than is necessary to charge the battery is both harmful to the battery and wasteful of electric energy. In practice the progress of the charging of a storage battery is usually indicated by a volt-meter provided for the purpose, and when the volt-meter indicates the completion of the charge the charging-current is interrupted by an attendant.

The object of the present invention is to avoid the necessity of an attendant to observe and to control the battery-charging operation, and to produce a device which will act automatically to discontinue the charging operation when the battery is completely charged, or in case an excessive charging-current is passed through the battery. To attain this object I take advantage of the well-known fact that overcharging or excessive flow of charging-current results in what is commonly termed "gassing" in the battery, that is to say, in the decomposition of the electrolyte and the production of gas at the surfaces of the plates. I employ this gas to actuate a circuit-controller which is connected with the source of supply of charging-current in such a manner as to discontinue the charging operation automatically when a substantial quantity of gas is produced in the battery. The gas may be utilized for this purpose in various ways, but as the simplest and the preferred method of doing so I inclose the battery in an air-tight casing and employ the pressure of the gas therein, acting through a flexible diaphragm, to produce the necessary mechanical action.

The accompanying drawing is a diagrammatic view, partly in vertical section, of apparatus embodying the present invention.

The illustrated embodiment of the invention comprises a storage-battery cell of ordinary form, a generator for producing the battery-charging current, a circuit-controller connected in series with the cell and the generator, a diaphragm mechanism for actuating the circuit-controller, and gas-tight means inclosing the cell and connecting it with the diaphragm so as to confine the gas generated in the cell.

The illustrated cell is provided with a jar 1 inclosing the plates 2 and the electrolyte and provided with a gas-tight cover so as to constitute a part of the gas-tight casing of the cell. The plates are provided with the usual electrodes 3 and 4, which are connected with a generator 5 from which the battery-charging current is derived, through suitable conductors 6. The circuit-breaker comprises a pivoted arm 7 coöperating with a fixed contact 8, these parts being connected in series with the cell and the generator.

The diaphragm mechanism by which the circuit-controller is actuated comprises a plunger 9 resting upon a diaphragm 10 of flexible material. The diaphragm is mounted within a gas-tight casing 11 which is connected with the battery-casing by a tube 12. This tube, as shown in the drawing, is connected with the battery-casing by a screw-plug 13 located in the ordinary filling-opening 14 in the cover of the battery. The battery-casing, the diaphragm-casing and the connecting tube constitute, together, means by which gas generated in the battery is confined, so that upon the completion of the charging operation, or upon the flow of an excessive charging current, the gas generated accumulates under pressure and acts upon the diaphragm so as to raise the plunger 9 and the arm 7 of the circuit-breaker and thus automatically open the charging-circuit and disconnect the battery from the generator.

The diaphragm-casing is provided with an outlet 15 controlled by a screw-threaded conical valve 16. This valve may be normally closed, in which case, after the battery has been once charged, no further flow of current occurs until the valve has been opened to allow the escape of gas. Where the battery is in constant use, however, so that the discharging and charging operations succeed each other at short intervals, the valve may be adjusted to a slightly-open position, so as to afford a restricted outlet for gas. During overcharging or the flow of excessive charging-current the gas is generated much faster than it can escape through this opening, so that the diaphragm operates as above described, but after the circuit has been interrupted the gradual escape of gas through the outlet finally permits the circuit-controller to close the charging-circuit again, whereupon the battery is recharged to compensate for current which has been drawn from the battery in the meantime.

While I have shown the circuit-controller as provided with a single pair of contacts connected in series with an ordinary generator and the battery, it will be understood that circuit-controllers of other forms may be used having any required number of contacts connected and arranged to control the charging operation in various manners.

I claim:—

1. In combination with a storage-battery and a circuit-controller for controlling the charging of the battery, a diaphragm mechanically connected with the circuit-controller to actuate the latter, and means for confining the gas generated in the battery and subjecting the diaphragm to the pressure thereof, said means having a minute, normally-open gas-outlet.

2. In combination with a storage-battery and a circuit-controller for controlling the charging of the battery, a diaphragm mechanically connected with the circuit-controller to actuate the latter, and means for confining the gas generated in the battery and subjecting the diaphragm to the pressure thereof, said means having a normally-open gas-outlet and a valve for adjusting the size of said outlet.

EDWARD A. HALBLEIB.

Witnesses:
FARNUM F. DORSEY,
D. GURNEE.